(12) United States Patent
Kojima

(10) Patent No.: US 7,470,070 B2
(45) Date of Patent: Dec. 30, 2008

(54) OPTICAL SCANNER DEVICE AND IMAGE FORMING APPARATUS

(75) Inventor: Takahiro Kojima, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 11/360,492

(22) Filed: Feb. 24, 2006

(65) Prior Publication Data
US 2006/0203301 A1    Sep. 14, 2006

(30) Foreign Application Priority Data
Mar. 10, 2005    (JP)    ............... 2005-066638

(51) Int. Cl.
G02B 6/36 (2006.01)
G02B 26/08 (2006.01)
G02B 5/32 (2006.01)
G02B 26/10 (2006.01)

(52) U.S. Cl. ............... 385/92; 385/147; 359/17; 359/202; 359/212; 359/226

(58) Field of Classification Search ............... 385/92, 385/94, 147; 359/17, 202, 212, 226
See application file for complete search history.

(56) References Cited

U.S. PATENT DOCUMENTS

| | | | | |
|---|---|---|---|---|
| 5,788,046 A * | 8/1998 | Lamah | ............... | 194/317 |
| 5,838,001 A * | 11/1998 | Minakuchi et al. | ............... | 250/236 |
| 6,483,530 B2 * | 11/2002 | Wilson | ............... | 347/263 |
| 6,840,641 B2 * | 1/2005 | Lang et al. | ............... | 359/871 |
| 6,980,340 B1 * | 12/2005 | Okura et al. | ............... | 359/200 |
| 2005/0186070 A1 * | 8/2005 | Zeng et al. | ............... | 415/211.2 |
| 2005/0232763 A1 * | 10/2005 | Cormier et al. | ............... | 415/208.2 |
| 2006/0171132 A1 * | 8/2006 | Tullidge et al. | ............... | 361/796 |

FOREIGN PATENT DOCUMENTS

JP    2004-125920 A    4/2004

OTHER PUBLICATIONS

U.S. Appl. No. 11/253,760, filed Oct. 20, 2005, Kojima.

* cited by examiner

*Primary Examiner*—Michelle R Connelly Cushwa
*Assistant Examiner*—Rhonda S Peace
(74) *Attorney, Agent, or Firm*—Foley & Lardner LLP

(57) ABSTRACT

A first wall is installed on a bottom portion of a housing along an outer peripheral thereof orthogonally to the bottom portion. A second wall is installed opposite to the first wall at a predetermined interval. Between the first wall and the second wall, a first rib parallel with the bottom portion for connecting the first wall and second wall is installed. Further, under the first rib, second ribs orthogonal to the bottom portion for connecting the first wall, second wall, and first rib are installed at fixed intervals. Furthermore, above the first rib, third ribs orthogonal to the bottom portion having the same height as that of the first wall and second wall for connecting the first wall and second wall are arranged so as to be shifted in position from the second ribs.

8 Claims, 5 Drawing Sheets

OPTICAL SCANNER DEVICE AND IMAGE FORMING APPARATUS

CROSS-REFERENCE TO RELATED APPLICATION

This application is based upon and claims the benefit of priority from the prior Japanese Patent Application No. 2005-066638, filed on Mar. 10, 2005; the entire contents of which are incorporated herein by reference.

BACKGROUND OF THE INVENTION

The present invention relates to an optical scanner device and an image forming apparatus.

In the image forming apparatus, the optical scanner device is installed. The optical scanner device is structured so as to store a rotational polygonal mirror (hereinafter referred to as a polygonal mirror) for reflecting and polarizing a light beam from a light source and optical elements such as an image forming lens for focusing the light beam polarized by the polygonal mirror on the surface of a photosensitive drum in an almost closed housing. In the housing for storing such optical elements, if the position relationship of the optical elements is shifted, a defective image is formed in the process of image formation. Therefore, the optical elements are fixed at predetermined positions of the housing with high precision of position.

However, the housing receives vibration due to driving of the image forming apparatus and vibration due to rotation of the polygonal mirror rotating at super-high speed. Further, noise is produced by the super-high speed rotation of the polygonal mirror. Therefore, it is required for the housing to reduce the vibration and noise inasmuch as is possible.

Conventionally, for example, as an example of increasing the rigidity and strength of the housing of the optical scanner device and suppressing vibration and deformation of the housing, there is a double-wall structure having an inner wall formed along an outer wall of the housing available.

The housing disclosed in Japanese Patent Application 2004-125920 is composed of a double-wall structure, in which between the outer wall and the inner wall, a rib perpendicular to the outer wall and inner wall is installed. However, in the housing of the structure described in Japanese Patent Application 2004-125920, a harness is installed between the outer wall and the inner wall, so that a sufficiently high rib cannot be used. Therefore, sufficient rigidity cannot be obtained and vibration and deformation of the housing cannot be suppressed sufficiently. Further, as the printing of the image forming apparatus is speeded up, the rotation of the polygonal mirror is also speeded up, so that a problem arises that the noise is increased due to it.

SUMMARY OF THE INVENTION

The present invention was developed to solve the aforementioned problems and is intended to provide an optical scanner device for suppressing vibration and noise and an image forming apparatus.

To accomplish the above object, the optical scanner device of the present invention comprises a scanning optical system to deflect and scan a light beam emitted from a light source by a rotational polygonal mirror and focusing it on a photosensitive member; and a housing to store the scanning optical system; wherein the housing includes: a bottom portion on which the scanning optical system is provided and fixed; a first wall installed on a part of the periphery of the bottom portion orthogonally to the bottom portion; a second wall installed outside the first wall at a predetermined interval with the first wall; and a plurality of orthogonal ribs which are installed between the first wall and the second wall orthogonally to the bottom portion, connect the first wall and second wall, and are the same in height as the first wall and second wall.

Further, the image forming apparatus of the present invention comprises a scanning optical system to deflect and scan a light beam emitted from a light source by a rotational polygonal mirror and focusing it on a photosensitive member; and a housing to storing the scanning optical system; wherein the housing includes: a bottom portion on which the scanning optical system is provided and fixed; a first wall installed on a part of the periphery of the bottom portion orthogonally to the bottom portion; a second wall installed outside the first wall at a predetermined interval with the first wall; a parallel rib installed in parallel with the bottom portion at a central part in the height direction of the first wall between the first wall and the second wall for connecting the first wall and the second wall; a plurality of first orthogonal ribs installed orthogonally to the bottom portion under the parallel rib between the first wall and the second wall for connecting the first wall and the second wall; and a plurality of second orthogonal ribs installed orthogonally to the bottom portion above the parallel rib between the first wall and the second wall having the same height as that of the first wall and second wall for connecting the first wall and the second wall.

DETAILED DESCRIPTION OF THE EMBODIMENTS

Hereinafter, the embodiments of the present invention will be explained with reference to the accompanying drawings.

Figure 1:
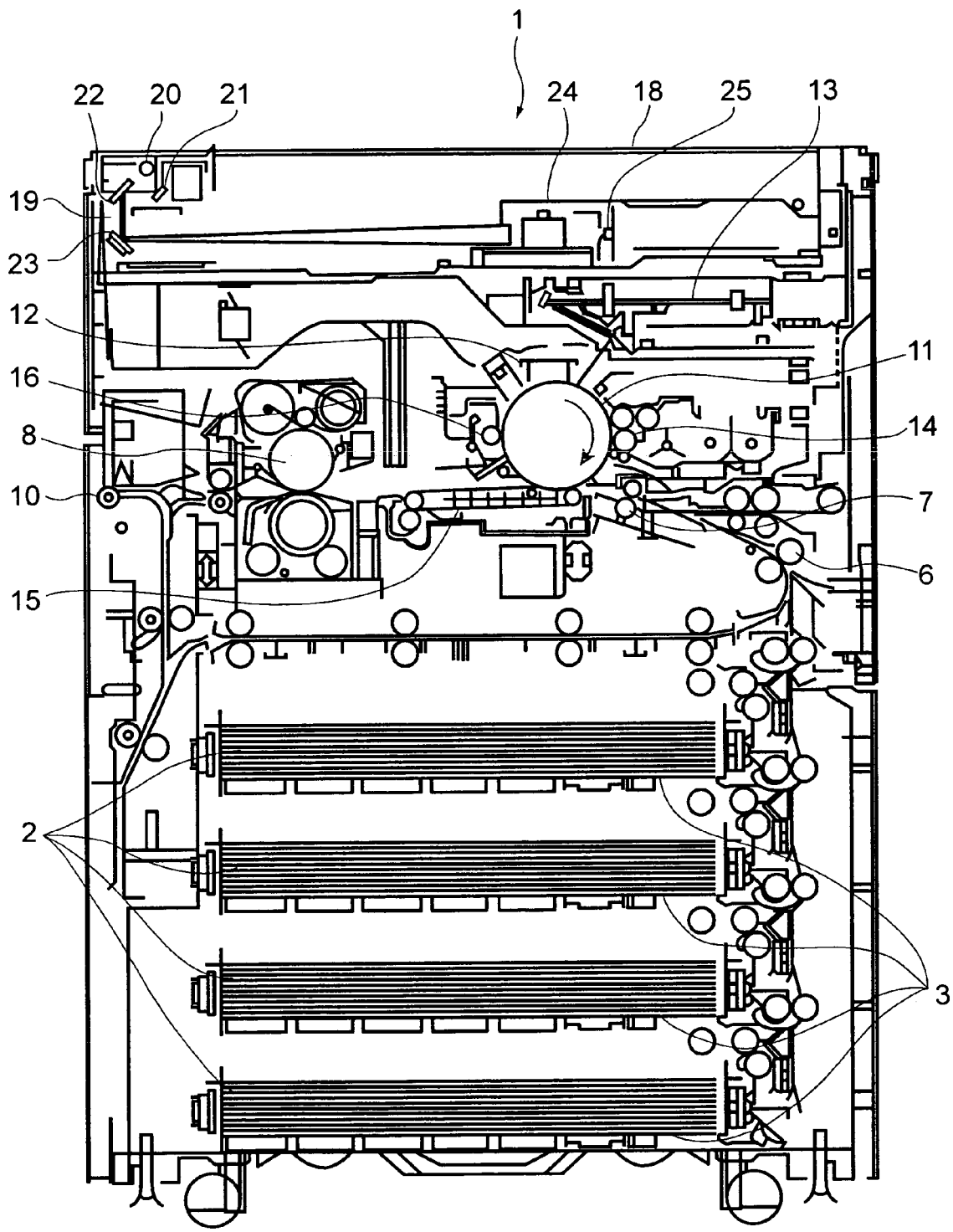
FIG. 1 is an internal schematic view showing the main body of the image forming apparatus having the optical scanner device which is an embodiment of the present invention.

FIG. 1 is an internal schematic view of the main body of the image forming apparatus having the optical scanner device of this embodiment. Under main body 1, a plurality of stages of paper supply cassettes for storing recording media 2 are installed. Recording media 2 are conveyed upward via a conveyance system. In the conveyance system, conveying rollers 6 for conveying recording media 2 up to the image forming section, aligning rollers 7, fixing device 8, and exit rollers 10 for discharging recording media 2 finishing image recording are arranged.

In the central part in main body 1, the image forming section is installed. The image forming section has a photosensitive drum 11 driven to rotate in the direction of the arrow shown in the drawing. Around photosensitive drum 11, in the direction of the arrow (clockwise), main charger 12, optical scanner device 13, developing device 14, transferring device 15, and cleaning device 16 are arranged.

On the upper part of main body 1, document table 18 is installed. Under document table 18, scanner 19 for reading a document on document table 18 is installed. Scanner 19 includes light source 20 for irradiating light to the document, first reflector mirror 21 for reflecting light reflected from the document in a predetermined direction, second and third reflector mirrors 22 and 23 for sequentially reflecting light reflected from first reflector mirror 21, condenser lens 24 for focusing the reflected light from third reflector mirror 23 to the image forming face of light-sensitive element 25, and light-sensitive element 25 for receiving the light focused by condenser lends 24.

Next, the operation of each device at time of image formation will be explained. Firstly, light is irradiated to the document on document table 18 from light source 20. The light is reflected by the document and is received by light-sensitive element 25 via first reflector mirror 21, second reflector mirror 23, third reflector mirror 23, and condenser lens 24, thus a document image is read. On the basis of this read information, a laser beam is irradiated to photosensitive drum 11 from optical scanner device 13. The surface of photosensitive drum 11 is uniformly charged by main charger 12, and a laser beam, which is modulated in intensity according to the image information, is irradiated from optical scanner device 13, thus an electrostatic latent image having the left charge of the image to be copied is formed on photosensitive drum 11. The electrostatic latent image formed on photosensitive drum 11 is adhered with toner charged at reverse polarity to the electrostatic latent image by developing device 14 and is changed to a visible image. And, the toner adhered to the electrostatic latent image is conveyed from underneath of the image forming section and is overlaid on recording medium 2 which is position-adjusted by aligning rollers 7, and a charge at reverse polarity to the charging polarity of toner is given to recording medium 2 from the rear of recording medium 2 by transferring device 15, and the toner image is transferred to recording medium 2 by electrostatic force. Recording medium 2 with the toner image transferred to be conveyed to fixing device 18 and is heated or pressurized by fixing device 8, thus the toner image is fixed on recording medium 2. Recording medium 2 with the toner image fixed to is discharged outside via exit rollers 10.

On the other hand, residual toner remaining on photosensitive drum 11 without being transferred is removed by cleaning device 16.

Figure 2A:
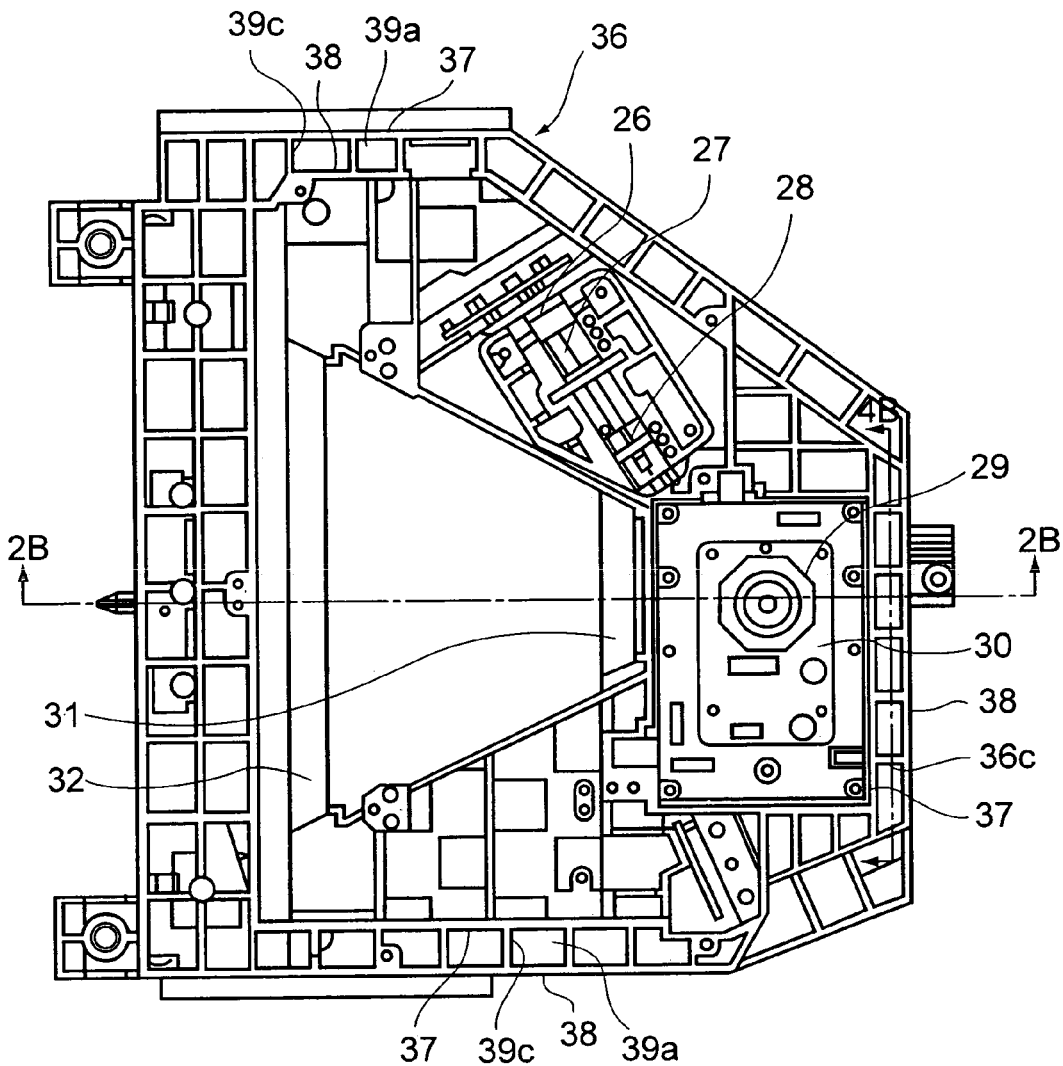
FIG. 2A is a plan view for explaining the optical scanner device of this embodiment.
Figure 2B:
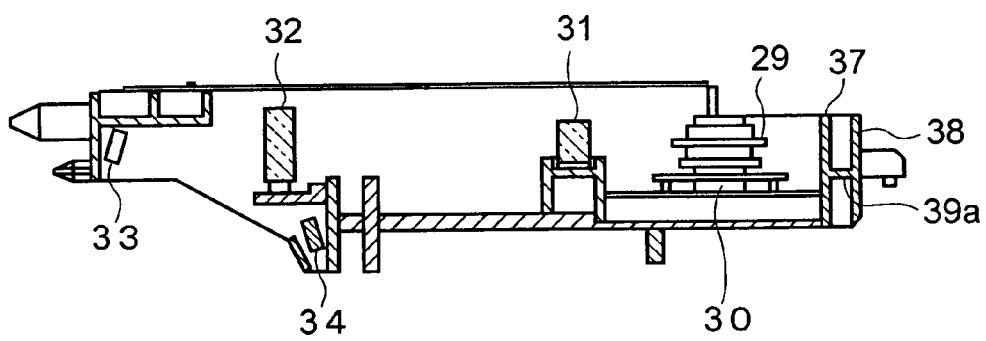
FIG. 2B is a cross sectional view along 2B-2B shown in FIG. 2A.

Next, optical scanner device 13 will be explained in detail by referring to FIGS. 2A to 4B. FIG. 2A is a plan view of the optical scanner device when the upper cover thereof is removed. FIG. 2B is a cross sectional view along 2B-2B shown in FIG. 2A. As shown in FIG. 2A, in optical scanner device 13, laser diode 26 which is a light-source for emitting a laser beam is installed. Further, focusing lens 27 for giving predetermined convergence to the laser beam from laser diode 26 is installed. Furthermore, cylinder lens 28 for giving focusing in the rotational direction of photosensitive drum 11 to the laser beam passing through focusing lens 27 is installed. And, polygonal mirror (rotating polygonal mirror) 29 having eight reflective surfaces on the outer periphery for deflecting (continuously reflecting) the laser beam focused in the rotational direction of photosensitive drum 11 by cylinder lens 28 in the axial direction of photosensitive drum 11 is installed. The polygonal mirror 29 is attached to the shaft of polygonal mirror motor 30 and is rotated at super-high speed.

Further, on the side where the reflected light of polygonal mirror 29 is emitted, first fθ lens 31 and second fθ lens 32 which are extended in the axial direction of photosensitive drum 11 are installed. First fθ lens 31 and second fθ lens 32 form the laser beam reflected by polygonal mirror 29 so that the relationship between rotational angle θ of the reflective surface of polygonal mirror 29 and focal distance f satisfies image height h. The laser beam reflected from polygonal mirror 29 passes through first fθ lens 31 and second fθ lens 32, is sequentially reflected by first and second mirrors 33 and 34, and is led to a predetermined position of photosensitive drum 11. Here, the scanning optical system composed of laser diode 26, focusing lens 27, cylinder lens 28, polygonal mirror motor 30, first fθ lens 31, second fθ lens 32, first mirror 33, and second mirror 34 is fixed to a predetermined position in the housing with high position precision.

Polygonal mirror 29, after polygonal mirror motor 30 integrally formed is increasingly accelerated by a motor drive current from a motor drive circuit not drawn and the number of rotations is increased up to a predetermined speed, rotates at a predetermined speed.

Figure 3:
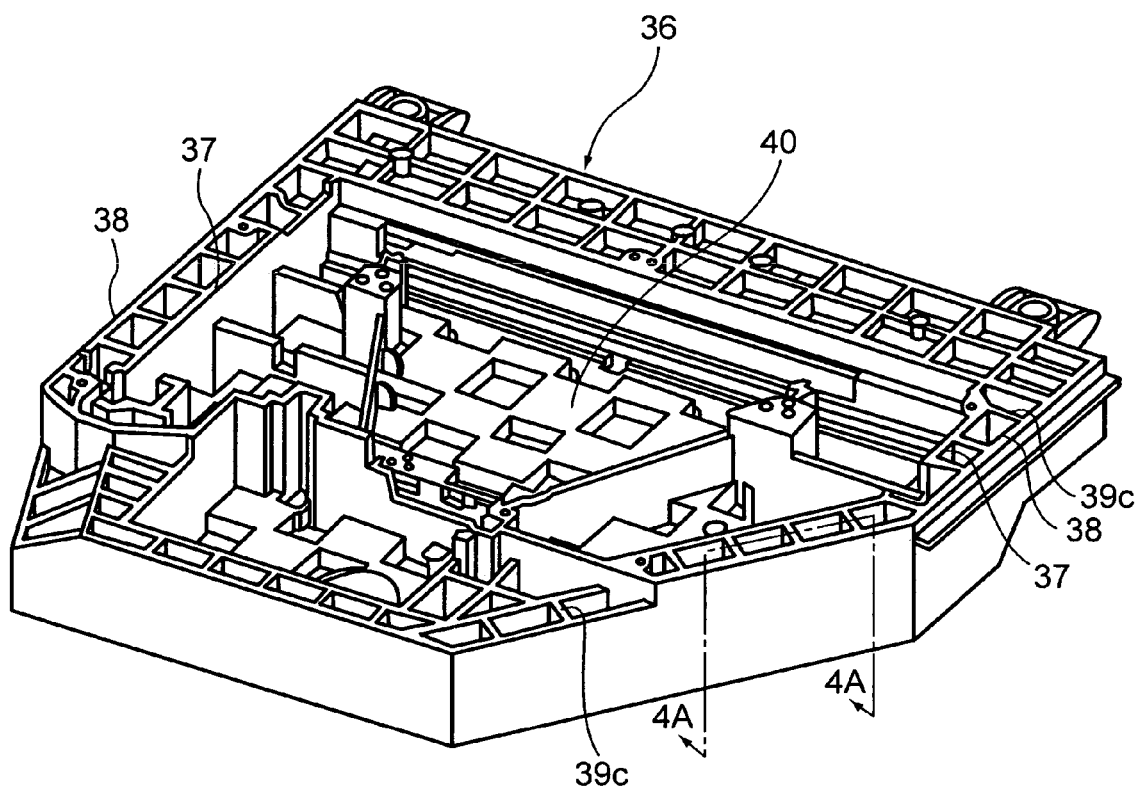
FIG. 3 is a perspective view showing the external form of the housing excluding the optical elements in the optical scanner device of this embodiment.

Housing 36 of the optical scanner device of this embodiment will be explained. In FIG. 3, housing 36 is made of resin such as polycarbonate or a metal such as aluminum and is formed in a box shape having bottom portion 40 and a rising part around bottom portion 40. On bottom portion 40 of housing 36, the optical elements such as laser diode 26, focusing lens 27, cylinder lens 28, polygonal mirror motor 30, first fθ lens 31, second fθ lens 32, first mirror 33, and second mirror 34 are fixed to predetermined positions. To suppress the aforementioned vibration, deformation, and noise of housing 36, on bottom portion 40 of housing 36, first wall 37 orthogonal to bottom portion 40 is installed along the outer circumference thereof. Outside first wall 37, second wall 38 is installed opposite to first wall 37 at a predetermined interval.

Figure 4A:
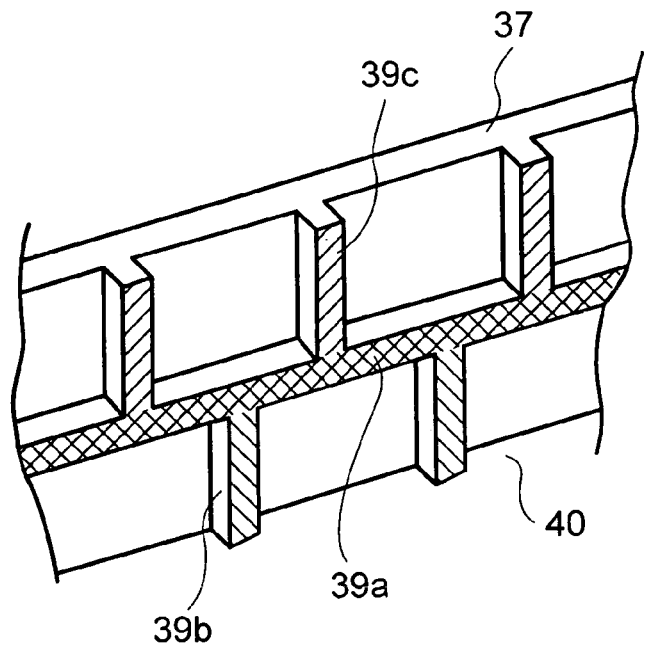
FIG. 4A is a partial perspective view along 4A-4A shown in FIG. 3.
Figure 4B:
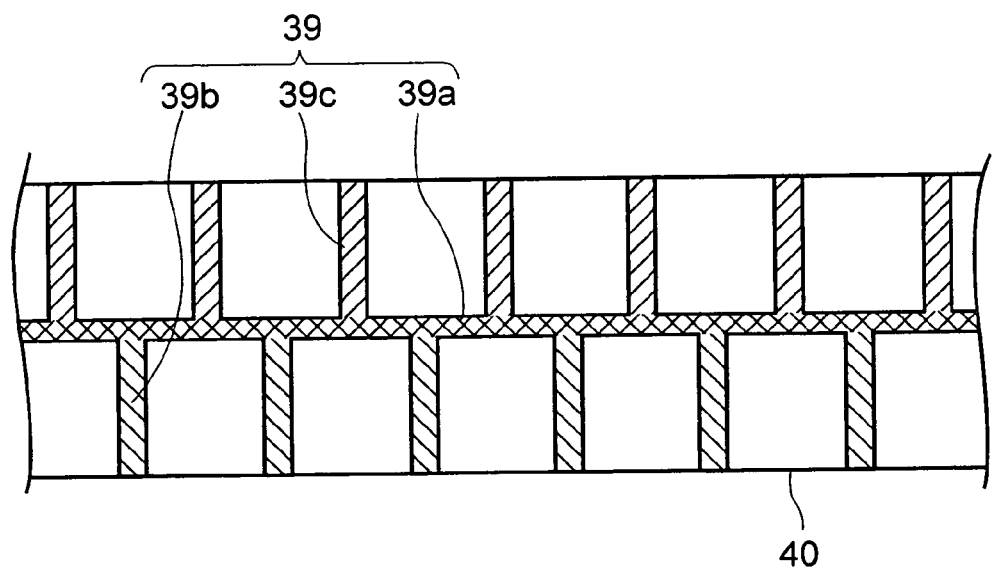
FIG. 4B is a cross sectional view along 4B-4B shown in FIG. 2A.

And, between first wall 37 and second wall 38, rib 39 for connecting first wall 37 and second wall 38 is installed. Here, the arrangement of rib 39 will be explained by referring to FIGS. 4A and 4B. FIG. 4 is a cross sectional perspective view of housing 36 which is cut along 4A-4A shown in FIG. 3. Further, although housing 36 is formed by the same material, for easy sight, each part of the section is indicated by different hatching. FIG. 4B is a cross sectional view along 4B-4B shown in FIG. 2A. Similarly, although housing 36 is formed by the same material, for easy sight, each part of the section is indicated by different hatching. Between first wall 37 and second wall 38, first rib 39a is installed. First rib 39a is parallel with bottom portion 40 and connects first wall 37 and second wall 38. On the bottom of first rib 39a, second ribs 39b, which are first orthogonal ribs, are installed at fixed intervals. Second ribs 39b are orthogonal to bottom portion 40 and connect first wall 37, second wall 38, and first rib 39a. On the top of first rib 39a, third ribs 39c, which are second orthogonal ribs, are installed. The upper ends of third ribs 39c are the same in height as the upper ends of first wall 37 and second wall 38, and third ribs 39c are orthogonal to first rib 39a and connect first wall 37, second wall 38, and first rib 39a. Third ribs 39c are arranged so as to be shifted from the positions where second ribs 39b are arranged in the peripheral direction of bottom portion 40. Namely, as shown in FIG. 4B, second ribs 39b are installed at predetermined intervals in the peripheral direction of bottom portion 40, though each of third ribs 39c is installed almost at the central part between two corresponding second ribs 39b. Since each of third ribs 39c is installed almost at the central part between two second ribs 39b, the area of first rib 39a positioned between each of second ribs 39b and each of third ribs 39c is made smaller, so that the intrinsic frequency is increased. Therefore, this structure increases the rigidity of housing 36 and causes no substantially mechanical resonate with the rotational frequency of polygonal mirror motor 30, so that the noise can be reduced.

Further, the vibration of housing 36 is suppressed, thus noise due to the vibration transferred to housing 36 from polygonal mirror motor 30 can be reduced. A polygonal mirror motor at the number of rotations of 61,000 rpm is loaded in the housing of this embodiment and a conventional housing not having the structure of this embodiment and the noise is compared between both housings. In the housing having the conventional structure, noise caused by the vibration transferred from the polygonal mirror motor to the housing is large, while in the housing in which the present invention is executed, it has been confirmed that noise from the embodiment can be totally reduced by 15 to 20 dB in comparison with that from the certain conventional housing.

Figure 5:
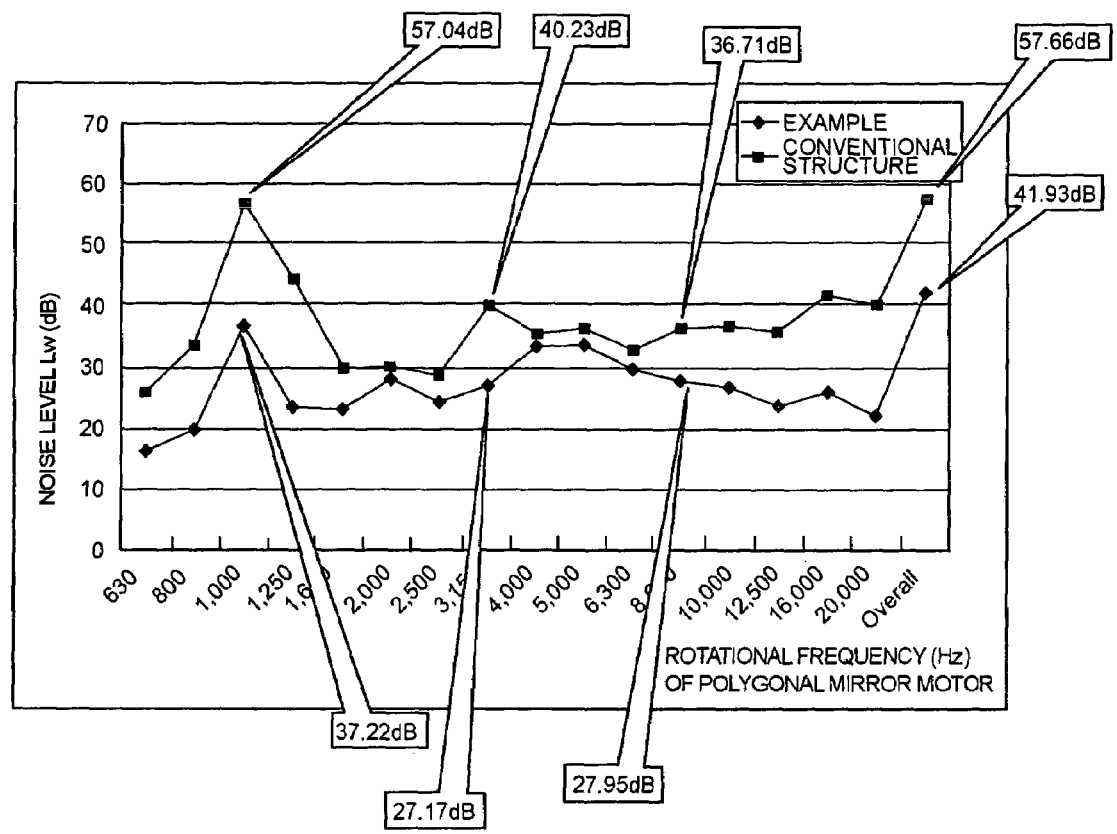
FIG. 5 is graphs showing comparison of the noise level between the optical scanner device of this embodiment and a conventional optical device.

By referring to FIG. 5, the difference in the noise level between the housing having the conventional structure and the housing of this embodiment will be explained. The axis of abscissa indicates the frequency (Hz) of noise and the axis of ordinate indicates the level (dB) of noise. Further, in the condition that the housing of the conventional structure in which the scanning optical system composed of the laser diode, focusing lens, cylinder lens, polygonal mirror motor, first fθ lens, second fθ lens, first mirror, and second mirror is arranged is installed in the main body of the image forming apparatus and the condition that housing 36 of this embodiment in which the scanning optical system is arranged is installed in the main body of the image forming apparatus, the noise level is measured under the condition that the respective polygonal mirror motors are rotated. Further, a polygonal mirror having an inscribed circle of 34 mm and eight reflective surfaces is rotated at 61,000 rpm and the noise level is measured.

At 1,000 Hz, the housing having the conventional structure produces a noise of 57.04 dB, while the housing of this embodiment produces a noise on a low level of 37.22 dB. 1,000 Hz indicates a cyclic vibration of one rotation of the polygonal mirror. Namely, the vibration of the polygonal mirror motor is heard as a sound, so that a sound according to the frequency of the rotation is produced. In this case, the motor rotates 61,000 rotations per minute, so that when the number of rotations is converted into frequency, 61,000 rpm/60 s≈1,016 Hz is obtained, thus a noise is produced.

At 3,150 Hz, the housing having the conventional structure produces a noise of 40.23 dB, while the housing of this embodiment produces a noise on a low level of 27.17 dB. 3,150 Hz is a switching cycle of the excitation circuit of the polygonal mirror motor. In this motor, the excitation circuit is switched 3 times for one rotation of the mirror, so that a noise is produced at a frequency three times of the component of one rotation of the motor.

At 8,000 Hz, the housing having the conventional structure produces a noise of 36.71 dB, while the housing of this embodiment produces a noise on a low level of 27.95 dB. At 8,000 Hz, since the polygonal mirror has eight reflective surfaces, when the polygonal mirror makes one rotation, a noise is produced at a frequency of 8 times thereof.

On the overall level of noise, the housing having the conventional structure produces a noise of 57.66 dB, while the housing of this embodiment produces a noise on a low level of 41.93 dB. Namely, there is a difference of noise level of 15.73 dB between the housing having the conventional structure and the housing of this embodiment. A reduction in the magnitude of noise can be achieved over not only the inherent frequencies of noise but also the entire measurement frequencies of noise.

According to the present invention, an optical scanner device and an image forming apparatus for suppressing vibration and noise can be provided.

What is claimed is:

1. An optical scanner device comprising:
   a scanning optical system to deflect and scan a light beam emitted from a light source by a rotational polygonal mirror and focusing it on a photosensitive member; and
   a housing to store the scanning optical system;
   wherein the housing includes:
      a bottom portion on which the scanning optical system is provided and fixed;
      a first wall installed on a part of the periphery of the bottom portion orthogonally to the bottom portion;
      a second wall installed outside the first wall at a predetermined interval with the first wall;
      a parallel rib installed in parallel with the bottom portion at a central part in the height direction of the first wall between the first wall and the second wall for connecting the first wall and the second wall;
      a plurality of first orthogonal ribs installed orthogonally to the bottom portion under the parallel rib between the first wall and the second wall for connecting the first wall and the second wall; and
      a plurality of second orthogonal ribs installed orthogonally to the bottom portion above the parallel rib between the first wall and the second wall having the same height as that of the first wall and second wall for connecting the first wall and the second wall, wherein each of the second orthogonal ribs is disposed at a central portion between two adjacent ones of the first orthogonal ribs.

2. The optical scanner device according to claim 1, wherein the first orthogonal ribs and the second orthogonal ribs are arranged so as to be shifted in position in the peripheral direction of the bottom portion.

3. The optical scanner device according to claim 1, wherein the housing is made of polycarbonate.

4. The optical scanner device according to claim 1, wherein the housing is made of aluminum.

5. An image forming apparatus comprising an optical scanner device for generating scanning light composed of a deflected light beam, a photosensitive member exposed by the light beam from the optical scanner device, a developing device for developing the photosensitive member, and a transfer section for transferring an image developed by the developing device;
   wherein the optical scanner device includes:
      a scanning optical system to deflect and scan a light beam emitted from a light source by a rotational polygonal mirror and focusing it on the photosensitive member; and
      a housing to store the scanning optical system;
   wherein the housing includes:
      a bottom portion on which the scanning optical system is provided and fixed;
      a first wall installed on a part of the periphery of the bottom portion orthogonally to the bottom portion;
      a second wall installed outside the first wall at a predetermined interval with the first wall;
      a parallel rib installed in parallel with the bottom portion at a central part in the height direction of the first wall between the first wall and the second wall for connecting the first wall and the second wall;

a plurality of first orthogonal ribs installed orthogonally to the bottom portion under the parallel rib between the first wall and the second wall for connecting the first wall and the second wall; and a plurality of second orthogonal ribs installed orthogonally to the bottom portion above the parallel rib between the first wall and the second wall having the same height as that of the first wall and second wall for connecting the first wall and the second wall, wherein each of the second orthogonal ribs is disposed at a central portion between two adjacent ones of the first orthogonal ribs.

6. The image forming apparatus according to claim 5, wherein the first orthogonal ribs and the second orthogonal ribs are arranged so as to be shifted in position in the peripheral direction of the bottom portion.

7. The image forming apparatus according to claim 5, wherein the housing is made of polycarbonate.

8. The image forming apparatus according to claim 5, wherein the housing is made of aluminum.

* * * * *